United States Patent [19]

Yu et al.

[11] Patent Number: 5,238,990
[45] Date of Patent: Aug. 24, 1993

[54] HIGH MODULUS TOUGHENED POLYAMIDE COMPOSITION

[75] Inventors: Thomas C. Yu, Chatham; Donald A. White, Keasbey; Hsien C. Wang, Edison, all of N.J.

[73] Assignee: Exxon Chemical Patents Inc., Linden, N.J.

[21] Appl. No.: 710,492

[22] Filed: Jun. 5, 1991

[51] Int. Cl.$^5$ ............................................. C08L 51/00
[52] U.S. Cl. ........................................ 524/504; 525/66; 525/179
[58] Field of Search .................... 525/66, 179; 524/504

[56] References Cited

U.S. PATENT DOCUMENTS

| | | | |
|---|---|---|---|
| 2,516,741 | 7/1950 | Young et al. | 525/178 X |
| 4,143,221 | 3/1979 | Naarmann et al. | 525/333.4 X |
| 4,174,358 | 11/1979 | Epstein | 525/183 |
| 4,350,794 | 9/1982 | Moncur | 525/183 |
| 4,593,066 | 6/1986 | Dean | 525/66 |
| 5,006,601 | 4/1991 | Lutz et al. | 525/66 |
| 5,013,789 | 5/1991 | Sakuma et al. | 525/66 |
| 5,063,268 | 11/1991 | Young | 524/286 |

FOREIGN PATENT DOCUMENTS

| | | |
|---|---|---|
| 0272695 | 6/1988 | European Pat. Off. . |
| 0372866 | 6/1990 | European Pat. Off. . |
| 0372869 | 6/1990 | European Pat. Off. . |

*Primary Examiner*—Joseph L. Schofer
*Assistant Examiner*—J. M. Reddick
*Attorney, Agent, or Firm*—M. L. Gibbons; J. E. Schneider

[57] ABSTRACT

A thermoplastic composition is provided which comprises a polyamide, a grafted polymer of an isomonoolefin and an alkylstyrene, such as a maleic anhydride-grafted copolymer of isobutylene and para-methylstyrene, and optionally a polyolefin polymer.

21 Claims, No Drawings

HIGH MODULUS TOUGHENED POLYAMIDE COMPOSITION

BACKGROUND OF THE INVENTION

1. Field of the Invention

The present invention relates to polyamide compositions having improved impact strength and high flexural modulus.

2. Description of Information Disclosures

Toughened thermoplastic polyamide compositions are known. See, for example, U.S. Pat. No. 4,174,358 which discloses a polyamide matrix and at least one other phase containing particles ranging from 0.01 to 10 microns of at least one specified polymer.

U.S. Pat. No. 4,350,794 discloses a polyamide composition prepared by melt blending of a polyamide resin and a halobutyl elastomer.

There is still a need to improve the impact strength of polyamide compositions, without substantial loss of the high flexural modulus of the polyamide.

It has now been found that the incorporation of certain polymers in polyamide compositions will produce toughened polyamide compositions having improved impact strength without substantial loss of the high flexural modulus of the polyamide.

SUMMARY OF THE INVENTION

In accordance with the invention, there is provided a thermoplastic composition comprising a polymer blend of (1) a polyamide, and (2) a grafted polymer derived from (A) a copolymer selected from the group consisting of a copolymer of a $C_4$ to $C_7$ isomonoolefin and an alkylstyrene, a halogen-containing copolymer of a $C_4$ to $C_7$ isomonoolefin and an alkylstyrene, and mixtures thereof, and (B) an unsaturated organic compound selected from the group consisting of an unsaturated carboxylic acid, an unsaturated carboxylic acid derivative and mixtures thereof.

In accordance with an other embodiment of the invention, the thermoplastic composition additionally comprises a polyolefin polymer.

DETAILED DESCRIPTION OF THE INVENTION

The Polyamide Component

Suitable thermoplastic polyamides (nylon) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidone, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon 12), polyhexamethyleneadipamide (nylon-6,6), polyhexamethlene-azelamide (nylon-6,9), polyhexamethylenesebacamide (nylon-6, 10), polyhexamethylenesophthalamide (nylon-6,IP) and the condensation product of 11-aminoundecanoic acid (nylon-11); partially aromatic polyamides made by polycondensation of meta xylene diamine and adipic acid such as the polyamides having the structural formula:

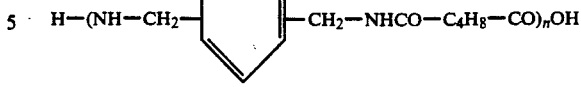

Furthermore, the partially aromatic polyamide may be reinforced, for example, by glass fibers. Additional examples of satisfactory polyamides are described in Kirk-Othmer, Encyclopedia of Chemical Technology, v. 10, page 919, and Encyclopedia of polymer Science and Technology, Vol. 10, pages 392–414. Commercially available thermoplastic polyamides may be advantageously used in the practice of this invention, those having a softening point or melting point between 160° C. to 275° C. being preferred.

The Grafted Polymer Component

The grafted polymer component is a reaction product of a copolymer (Reactant A) and an unsaturated organic compound (Reactant B).

Reactant A—The Copolymer

Suitable copolymers of a $C_4$ to $C_7$ isomonoolefin and an alkylstyrene which may be a mono or a polyalkylstyrene, for use as a reactant to produce the polymers of the present invention comprise at least 0.5 weight percent of the alkylstyrene moiety. For elastomeric copolymer products, the alkylstyrene moiety may range from about 0.5 weight percent to about 20 weight percent, preferably from about 1 to about 20 weight percent, more preferably from about 2 to about 20 weight percent of the copolymer. The preferred copolymers are copolymers of a $C_4$ to $C_7$ isomonoolefin and a para-alkylstyrene.

The copolymers of the isomonoolefin and para-alkylstyrene copolymers suitable as reactant A of the present invention include copolymers of isomonoolefin having from 4 to 7 carbon atoms and a para-alkylstyrene, such as those described in European patent application 89305395.9 filed May 26, 1989, (Publication No. 0344021 published November 29, 1989). The copolymers have a substantially homogeneous compositional distribution and include the para-alkylstyrene moiety represented by the formula:

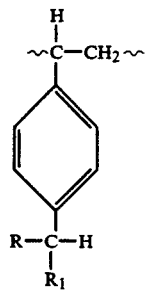

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof.

The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{M}_n$) of at least about 25,000, preferably at least about 30,000, more preferably at least about 100,000. The copolymers also, preferably, have a ratio of weight average molecular weight ($\overline{M}_w$) to number average molecular weight ($\overline{M}_n$), i.e., $\overline{M}_w/\overline{M}_n$ of less than about 6, preferably less than about 4, more preferably less than about 2.5, most preferably less than about 2. The brominated copolymer of the isoolefin and para-alkylstyrene obtained by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

Suitable halogen-containing copolymers of a $C_4$ to $C_7$ isomonoolefin and a para-alkylstyrene for use as reactant A to produce the polymers of the present invention include the halogen-containing copolymers corresponding to the previously described isomonoolefin—alkylstyrene copolymers which may be obtained by halogenating the previously described copolymers. The suitable halogen-containing copolymers comprise at least 0.5 weight percent of the alkylstyrene moiety. For elastomer copolymer products, the alkylstyrene moiety may range from about 0.5 weight percent to about 20 weight percent, preferably from about 1 to 20 weight percent, more preferably from about 2 to 20 weight percent of the copolymer. The halogen content of the copolymers may range from above zero to about 7.5 weight percent, preferably from about 0.1 to about 7.5 weight percent.

The preferred halogen-containing copolymers useful in the practice of the present invention have a substantially homogeneous compositional distribution and include the para-alkylstyrene moiety represented by the formula:

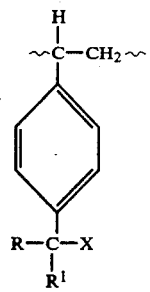

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989). Preferably, the halogen is bromine.

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in catalyst poisoning or excessive molecular weight depression complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.01 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point of para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methylstyryl moiety in the copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene can be highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis(2,4-dimethylpentane nitrile), at about 55° to 80° C. for a time period ranging from about 4.5 to about 30 minutes, followed by a caustic quench. The recovered polymer is washed in basic water wash and water/isopropanol washes, recovered, stabilized and dried.

Reactant B—The Unsaturated Organic Compound

Suitable unsaturated organic compound for use as reactant with the copolymer include unsaturated carboxylic acids, unsaturated carboxylic acid derivatives and mixtures thereof. The carboxylic acid may be a mono or polycarboxylic acid, preferably having from 3 to 12 carbon atoms. By way of example, the unsaturated carboxylic acid may be maleic acid, fumaric acid, citraconic acid, mesaconic acid, itaconic acid, himic acid, acetylenedicarboxylic acid and mixtures thereof. The preferred carboxylic acid is maleic acid. The unsaturated carboxylic acid derivative may be a cyclic acid anhydride, an amide, an imide, an ester and mixtures thereof. Suitable cyclic acid anhydrides include maleic anhydride, citraconic anhydride, itaconic anhydride, and himic anhydride. The preferred anhydride is maleic anhydride.

Suitable esters include mono- and di-esters of diacids specified above, e.g. monomethyl maleate, dimethyl maleate, diethyl maleate, diphenyl maleate, dibutyl fumarate.

Suitable amides include mono- and di-amides of diacids specified above, e.g. maleamic acid, N-methylmaleamic acid, maleanilic acid.

Suitable imides include imides of diacids specified above, e.g. maleimide, N-methylmaleimide, N-phenylmaleimide.

The preferred carboxylic acid derivatives are selected from the group consisting of maleic anhydride, a dialkyl maleate, itaconic anhydride, himic anhydride, an alkylmaleamide, an N-alkylmaleimide, an alkylmaleate and mixtures thereof.

The reactant (B) derived moieties may be present in the grafted polymer component of the present invention in an amount ranging from about 0.5 to 0.001 millimole (mmole) per gram, preferably from about 0.2 to 0.002 mmole per gram, more preferably from about 0.1 to 0.005 mmole per gram of the grafted polymer product.

The grafted polymer component of the present invention is prepared by reacting a copolymer, Reactant A previously described, with an unsaturated organic compound, Reactant B previously described, in the presence of a free radical initiator at grafting reaction conditions in a reaction zone.

When it is desired to graft a derivative of an acid or anhydride onto the copolymer (Reactant A), instead of reacting the copolymer with the acid derivative, the copolymer (Reactant A) may be reacted with the unsaturated carboxylic acid or anhydride and the resulting carboxylic acid grafted or carboxylic acid anhydride grafted polymer may subsequently be reacted with a desired functional group-containing compound. For example, the maleic anhydride grafted copolymer may be reacted with an amine, $RNH_2$, as shown in the following schematic equation wherein —MM— denotes the polymer chain and R is an alkyl group:

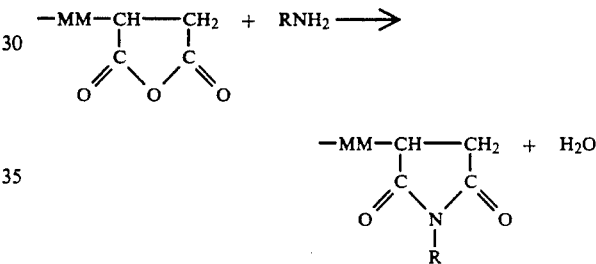

The copolymer of isobutylene and an alkylstyrene or the corresponding halogenated copolymer (Reactant A) is contacted with Reactant B in the presence of a free radical initiator which may be a chemical compound or radiation. Suitable free radical initiators include (1) thermally decomposable compounds which generate radicals such as azo compounds or organic peroxides; (2) compounds which generate free radicals by non-thermal methods such as photochemical or redox processes; (3) compounds which have inherent radical character such as molecular oxygen; or (4) electromagnetic radiation such as X-rays, electron beams, visible light, ultraviolet-light.

Suitable organic peroxide compounds include hydroperoxides, dialkyl peroxides, diacyl peroxides, peroxyesters, peroxydicarbonates, peroxyketals, ketone peroxides and organosulfonyl peroxides.

Preferably, the free radical initiator is an organic peroxide compound having a half-life, at the reaction temperature, of less than one tenth of the reaction/residence time employed.

When the free radical initiator is a initiator compound to Reactant B may range from 0.001:1 to 1:1, preferably from 0.01:1 to 0.1:1.

Desirably, the molar amount of Reactant B expressed in mmoles per gram, in the contacting zone may be 1 to 10 times the molar amount of these components as is desired in the final grafted copolymer. Thus, when the molar amount of B in the grafted copolymer is 0.05 mmoles per gram of product polymer, the amount of B introduced in the reaction zone is suitably from about 0.05 to about 0.5 mmoles per gram of component A plus component B present in the reaction mixture.

The grafting reaction may be conducted in the absence of a diluent or in the presence of a diluent.

When a diluent is present in the reaction zone, suitable diluents include saturated aliphatic hydrocarbons, aromatic hydrocarbons, and perhalogenated hydrocarbons.

Preferably, the grafting reaction to produce the grafted polymer component of the present invention is conducted in the absence of a diluent and in the melt phase, wherein the copolymer (Reactant A) is in the molten phase. The reaction temperature is chosen to be appropriate for the initiator used.

Suitable reaction conditions include a temperature ranging from about 0° C. to about 300° C. The suitable reaction temperature will vary according to the free radical initiator used. When an azo compound is used as the initiator, suitable temperatures will generally range from about 25° to 100° C. When an organic peroxide is used as initiator, suitable temperatures range from about 25° to about 250° C. Higher temperatures may be used for other types of free radical initiators. When the reaction is conducted in the presence of a diluent, i.e. solution processes, the reaction temperature will generally be below 150° C. For melt phase processes, (i.e., bulk phase processes), the reaction temperature may range from about 25° C. such as in conventional electron beam irradiation equipment to about 250° C. such as in polymer mixing equipment. The process for producing the grafted polymers of the present invention may be conducted as a batch process or as a continuous process.

The reaction is performed in a suitable reaction zone which may be a polymer mixing device such as a Banbury mixer, a single or multiple screw extruder and the like for melt phase polymers or a glass flask, metal tank or tube when the process is conducted in the presence of a diluent.

When the molten copolymer itself is the reaction medium, uniform dispersion of the grafting agent and of the initiator is preferably performed by predispersion or by the incorporation of suitable mixing elements into the reactor (e.g., incorporation of mixing screw sections in an extruder). When electromagnetic radiation is used, dispersion of the initiator will include uniform exposure of all parts of the copolymer or copolymer solution to the beam.

In a preferred embodiment, the grafting process to produce the grafted polymer of the invention is carried out in a twin screw extruder having, in sequence, screw elements, which will (i) heat the polymer by shear and compression to or close to the desired reaction temperature, (ii) mix the copolymer at or close to reaction temperature with the grafting agent, (iii) mix the copolymer containing the grafting agent with the initiator, (iv) allow appropriate residence time for the grafting reaction, (v) allow venting of unreacted grafting agent and initiator coproducts, (vi) allow mixing of any desired stabilizers or additives and (vii) forward the reacted, vented stabilized polymer to an appropriate finishing device (e.g. drumming device, baler, pelletizer, etc.).

In the composition of the present invention, the polyamide component may suitably be present in an amount ranging from about 15 to about 95 weight percent, preferably from about 65 to about 85 weight percent, and the grafted polymer component may be present from about 5 to about 85 weight percent, preferably from about 15 to about 35 weight percent, based on the weight percent of the polymer blend.

The term "polymer blend" is used herein to denote the blend of at least one polyamide, at least one grafted polymer and any other optional polymers (elastomer or non-elastomer) that may be a component of the composition.

The compositions of the present invention may comprise an additional optional polyolefin polymer component.

The Optional Polyolefin Polymer Component

Suitable optional polyolefin components include:
(i) Reactant (A) of the grafted polymer component, that is, the copolymer of a $C_4$ to $C_7$ isomonoolefin and an alkylstyrene previously described, preferably a copolymer of a $C_4$ to $C_7$ isomonoolefin and a para-alkylstyrene, more preferably a copolymer of isobutylene and para-methylstyrene;
(ii) a polyolefin polymer which may be a homopolymer such as polyethylene and polypropylene, or a heteropolymer such as ethylene and at least one higher alpha olefin such as $C_2$ to $C_{16}$ alpha olefins, for example, propylene, butene, 1-pentene, 1-hexene, 1-octene, 1-dodecene and mixtures thereof. The preferred heteropolymer is a copolymer of ethylene and propylene.
(iii) mixtures of (i) and (ii).

The optional polyolefin may be a high density polyolefin, such as high density polyethylene.

The preferred optional polyolefin polymers include reactant (A) of the grafted polymer component, described above, and polyethylene, polypropylene and ethylene propylene copolymers, and mixtures thereof.

The more preferred optional polyolefin polymer is a copolymer of isobutylene and para-methylstyrene.

Suitable compositional ranges of the polymer blend for a composition comprising at least 3 polymer components include:
1. The polyamide component ranging from about 60 to about 99 percent by weight.
2. The grafted polymer component ranging from about 1 to about 40 percent by weight.
3. The polyolefin polymer component ranging from about above 0 to about 39 percent by weight.

Preferred compositional ranges for the 3-polymer component blend include:
1. The polyamide component ranging from about 70 to about 95 percent by weight.
2. The grafted polymer component ranging from about 5 to about 30 percent by weight.
3. The polyolefin polymer component ranging from about 0 to about 25 percent by weight.

More preferred compositional ranges for the polymer blend include:
1. The polyamide component ranging from about 80 to about 90 percent by weight.
2. The grafted polymer component ranging from about 10 to about 20 percent by weight.
3. The polyolefin polymer component ranging from above 0 to about 15 percent by weight.

The polymer blend of the present invention may comprise from about 25 to about 100 weight percent of the overall composition.

In addition to its polymer components, the composition of the present invention may comprise fillers and additives such as antioxidants, antiozonants, stabilizers, rubber processing oils, lubricants, waxes, foaming agents, flame retardants, pigments, and other known processing aids. The pigments and fillers may comprise up to 30 weight percent of the total composition based on the polymer components plus additives.

The composition of the present invention is prepared by mixing the polyamide component, the grafted polymer and optional other polymers at a temperature sufficient to soften the polyamide component and any other optional polymer, for example, at a temperature of at least about the melting point of the polyamide, in conventional mixing equipment such as a Brabender® mixer or an extruder. Preferably, the blending of the components is performed in an extruder under shearing conditions. The non-polymeric components may be added at any stage of the mixing step, that is, before, during or after mixing the polymers.

The secant flexural modulus of the thermoplastic composition may range from about 15,000 kg/cm² to about 60,000 kg/cm², preferably from about 20,000 kg/cm² to about 30,000 kg/cm², measured according to ASTM D790 at 1% strain.

Preferred Embodiments

The following examples are presented to illustrate the invention. All parts and percentages herein are by weight unless specifically stated otherwise.

In examples 1 and 2, the compositions in accordance with the present invention and the comparative compositions were mixed in a 0.8" Welding Engineers counter-rotating twin screw extruder fitted with a strand die at the extruder exit. The extruder strands were then cooled in a water bath before being reduced by a pelletizer into approximately ⅛" by ⅛" pellets. The polyamide resins were dried at 150° F. under vacuum for at least four hours before compounding. All pelletized compositions were again dried in the same drier under the same conditions for at least four hours to remove surface moisture before being molded into various test specimens on a 15 ton Boy® injection molding machine.

The abbreviations and/or trademarks used in the following examples are shown in Table III. The test methods used to measure the properties are shown in Table IV.

EXAMPLE 1

Table I shows four compositions of polyamide 6,6. Composition A was a 80/20 blend of Celanese Nylon 1001 and a maleated copolymer of isobutylene and para-methylstyrene herein designated Copolymer T, and Composition B was an identical blend in which the Celanese Nylon 1001 was replaced by another brand of PA 6,6 Zytel 101. Composition C was an 80/20 blend of Celanese Nylon 1001 and a copolymer of isobutylene and para-methylstyrene herein designated Copolymer Y, and Composition D was the unmodified Celanese Nylon 1001 control. A small amount of thermal stabilizer, Irganox B-215 was added to each blend to minimize degradation. Comparison of Compositions C and D indicates that impact improvement. In Compositions A and B, the addition of 20% of Copolymer T caused the room temperature notched Izod to increase ten fold, while still maintaining a high flexural modulus in the 280,000 psi range (i.e. 19,700 kg/cm²) or about 70% of the flexural modulus of the polyamide component.

Copolymer T comprised 0.10 millimole (mmole) per gram or 1.0 weight percent of moieties derived from maleic anhydride and 10 weight percent of moieties derived from para-methylstyrene.

Copolymer Y comprised 2.4 mole percent of moieties derived from para-methylstyrene and had a Mooney viscosity (1+8) of 31 at 125° C.

Compositions A and B are compositions in accordance with the present invention.

EXAMPLE 2

Table II shows five compositions of polyamide 6. Composition E was an 80/20 blend of Capron brand of PA 6 with Copolymer T. In Composition F, 5% of Copolymer T was replaced with equal amount of Copolymer Y, and in Composition G, 10% Copolymer T was replaced with Copolymer Y. Composition H shows that all 20% of Copolymer T was replaced by Copolymer Y. Finally, Composition I was the unmodified PA 6. A small amount of thermal stabilizer, Irganox B-215, was added to each blend to minimize degradation. Compositions H and I a gains showed that Copolymer Y alone was not suitable as an impact modifier. On the other hand, Copolymer T and a combination of Copolymer T and Copolymer Y were very good impact modifiers for PA 6. It should be noted that in Compositions E, F, and G, impact improvement was not at the expense of corresponding reduction of flexural modulus. Addition of 20% Copolymer T or a mixture of Copolymer T and Copolymer Y only slightly reduced the flexural modulus from 380,000 psi (i.e. 26,700 kg/cm²) to about 310,000 psi (i.e. 21,800 kg/cm²) or over about 80 percent of the flexural modulus of the polyamide component.

TABLE I

COPOLYMER T/PA 6,6 BLENDS (DRY-AS-MOLDED TEST SPECIMENS)

| Composition | A | B | C | D |
|---|---|---|---|---|
| Celanese 1001 | 80 | | 80 | 100 |
| Zytel 101 | | 80 | | |
| Copolymer T | 20 | 20 | | |
| Copolymer Y | | | 20 | |
| Irganox B215 | 0.1 | 0.1 | 0.1 | |
| Property | | | | |
| Tensile | | | | |
| Tensile Stress @ Y, Kpsi | 7.5 | 7.6 | 8.2 | 11.5 |
| Tensile Stress @ B, Kpsi | 7.3 | 7.2 | 8 | 12 |
| Elong. @ Y, % | 6.6 | 7.3 | 8.2 | 8 |
| Elong. @ B, % | 23 | 31 | 19.3 | 50 |
| Flexural Modulus, Kpsi | 284 | 294 | 335 | 420 |
| Notched Izod, ⅛", ft-lb/in | | | | |
| R.T. | 12.9 | 9.5 | 1.2 | 1 |
| 0° C. | 2.7 | 2.7 | | |
| −20° C. | 1.9 | 1.9 | 0.6 | 0.6 |

TABLE II

COPOLYMER T/PA 6 BLENDS (DRY-AS-MOLDED TEST SPECIMENS)

| Composition | E | F | G | H | I |
|---|---|---|---|---|---|
| CAPRON 8209F | 80 | 80 | 80 | 80 | 100 |
| Copolymer T | 20 | 15 | 10 | | |
| Copolymer Y | | 5 | 10 | 20 | |
| IRGANOX B-215 | 0.1 | 0.1 | 0.1 | 0.1 | |
| Property | | | | | |
| Tensile | | | | | |
| Tensile Stress @ Y, Kpsi | 7.7 | 7.5 | 7.7 | 7.6 | 10.5 |
| Tensile Stress @ B, Kpsi | 6.3 | 6.1 | 6.3 | 6.9 | 7.4 |
| Elong. @ Y, % | 7.3 | 7.3 | 7.3 | 7.3 | 8.5 |
| Elong. @ B, % | 49 | 107 | 78 | 16 | 480 |
| Flexural Modulus, Kpsi | 323 | 322 | 311 | 255 | 380 |

TABLE II-continued
COPOLYMER T/PA 6 BLENDS
(DRY-AS-MOLDED TEST SPECIMENS)

| Composition | E | F | G | H | I |
|---|---|---|---|---|---|
| Notched Izod, ⅛", ft-lb/in | | | | | |
| R.T. | 14.4 | 16 | 15.1 | 2 | 1.1 |
| 0° C. | 2.8 | 3.1 | 3 | 1.6 | 1.6 |
| −10° C. | 2.3 | 2.5 | 2.3 | | |
| −20° C. | 1.7 | 2.3 | 1.9 | 1.3 | 0.7 |
| −30° C. | 1.6 | 1.9 | 1.6 | | |

TABLE III
ABBREVIATIONS AND TRADEMARKS

| Ingredient | Description |
|---|---|
| Celanese Nylon 1001 Hoechst-Celanese | Polyamide 6,6 (PA 6,6) |
| Zytel 101 E. I. DuPont | Polyamide 6,6 (PA 6,6) |
| Capron 8209F Allied Signal | Polyamide 6 (PA 6) |
| Irganox B-215 Ciba Geigy | 33/67 Blend of Irganox 1010 and Irgafos 168 |
| Irganox 1010 Ciba Geigy | Tetrakis (methylene (3,5-di-tert-butyl-4-hydroxy-hydrocinnamate) methane |
| Irgafos 168 Ciba Geigy | Tris (2,4-di-tert-butyl-phenyl) phosphate |

TABLE IV
TEST METHOD

| Test | Test Method |
|---|---|
| Tensile Strength, psi | ASTM D-638 |
| Elongation, % | ASTM D-638 |
| Flexural Modulus, psi | ASTM D-790 |
| Notched Izod Impact, ft-lb/in | ASTM D-256 |
| Mooney Viscosity | ASTM D-1646 |

EXAMPLE 3

Polyamide 6 (Allied Capron 8209F) was dried in an oven at 100° C. overnight. The dried polyamide (200 g) was charged to a 300 ml Brabender mixer and brought to about 250° C. by a combination of internal mixing and external heating. Copolymer T (50 g) was added and mixing continued for 3 minutes at 250° C. The discharged blend was allowed to cool to room temperature in a desiccator and then ground. Test specimens were made using a Boy ® injection molding machine. The blend had an Izod impact strength at room temperature of 10.7 ft.lbs/in. and at 0° C. of 2.5 ft.lbs/in. Its flexural modulus was 295 kpsi (i.e. 20,700 kg/cm$^2$). This composition (J) is in accordance with the present invention.

EXAMPLE 4

The following composition was mixed in the 0.8" Welding Engineers twin screw extruder after the manner of example 1: polyamide 6, Capron 8209F, (80%), Copolymer T (15%), high density polyethylene, grade HD 6705.39 from Exxon Chemicals, USA, (5) and Irganox B-215 (0.1 phr).

Test specimens were made using a Boy ® injection molding machine. The blend, herein designated Composition K, had a notched Izod impact strength of 15.5 ft. lbs/inch. Comparison with the data for compositions E and F above indicates that high density polyethylene was effective as the optional polyolefin polymer of the present invention and comparable in its effect to Copolymer Y. Composition K, which is a composition in accordance with the present invention, had a flexural modulus of 293 kpsi (i.e., 20,600 kg/cm$^2$).

What is claimed is:

1. A thermoplastic composition comprising a polymer blend comprising:
   (1) a polyamide; and
   (2) a grafted polymer consisting of a (A) copolymer selected from the group consisting of a copolymer of a $C_4$ to $C_7$ isomonoolefin and a para-alkylstyrene, wherein said para-alkylstyrene comprises 0.5 to about 20 wt. % of said copolymer, a halogenated copolymer of a $C_4$ to $C_7$ isomonoolefin and a para-alkylstyrene wherein said para-alkylstyrene comprises 0.5 to 20 wt. % of said halogenated copolymer, and mixtures thereof; and (B) an unsaturated organic compound selected from the group consisting of an unsaturated carboxylic acid, an unsaturated carboxylic acid derivative and mixtures thereof wherein said unsaturated organic compound is grafted onto said copolymer.

2. The thermoplastic composition of claim 1, wherein said polyamide is present in an amount ranging from about 15 to about 95 weight percent, and said grafted polymer is present in an amount ranging from about 5 to about 85 weight percent, based on said polymer blend.

3. The thermoplastic composition of claim 1, wherein said polyamide is present in an amount ranging from about 65 to about 85 weight percent, and said grafted polymer is present in an amount ranging from about 15 to about 35 weight percent, based on said polymer blend.

4. The thermoplastic composition of claim 1, wherein said polyamide is selected from the group consisting of nylon 6; nylon 6,6; nylon 11, and mixtures thereof.

5. The thermoplastic composition of claim 1, wherein said unsaturated organic compound B is grafted onto said copolymer in an amount from about 0.5 to 0.001 millimole per gram of said grafted polymer.

6. The thermoplastic composition of claim 1, wherein said copolymer (A) is selected from the group consisting of a copolymer of isobutylene and para-methylstyrene, a halogen-containing copolymer of thereof.

7. The thermoplastic composition of claim 1, wherein said copolymer (A) is a copolymer of isobutylene and para-methylstyrene.

8. The thermoplastic composition of claim 1, wherein said copolymer (A) is a bromine-containing copolymer of isobutylene and para-methylstyrene.

9. The thermoplastic composition of claim 1, wherein said unsaturated organic compound is a carboxylic acid selected from the group consisting of a $C_3$ to $C_{12}$ monocarboxylic acid, a $C_3$ to $C_{12}$ polycarboxylic acid and mixtures thereof.

10. The thermoplastic composition of claim 9, wherein said carboxylic acid is a polycarboxylic acid selected from the group consisting of maleic acid, fumaric acid, citraconic acid, mesaconic acid, itaconic acid, acetylenedicarboxylic acid and mixtures thereof.

11. The thermoplastic composition of claim 1, wherein said unsaturated organic compound is a carboxylic acid derivative selected from the group consisting of a cyclic acid anhydride, an amide, an imide, an ester and mixtures thereof.

12. The thermoplastic composition of claim 11, wherein said carboxylic acid derivative is selected from the group consisting of maleic anhydride, itaconic anhydride, a dialkyl maleate, an N-alkylmaleimide, a dialkyl fumarate, and mixtures thereof.

13. The thermoplastic composition of claim 1, wherein said copolymer (A) is a copolymer of isobutylene and para-methylstyrene and said unsaturated organic compound (B) is selected from the group consisting of maleic anhydride, N-ethylmaleimide, and mixtures thereof.

14. The thermoplastic composition of claim 13, wherein said unsaturated organic compound is grafted onto said grafted polymer in an amount ranging from about 0.5 to 0.001 millimole per gram of said grafted polymer.

15. The thermoplastic composition of claim 1, additionally comprising an ungrafted polyolefin.

16. The thermoplastic composition of claim 15, wherein said polyolefin is a copolymer of a $C_4$ to $C_7$ isomonoolefin and an alkylstyrene.

17. The thermoplastic composition of claim 16, wherein said copolymer of a $C_4$ to $C_7$ isomonoolefin and an alkylstyrene is a copolymer of isobutylene and para-methylstyrene.

18. The thermoplastic composition of claim 15, wherein said polyolefin is polyethylene.

19. The thermoplastic composition of claim 1, additionally comprising a component selected from the group consisting of a filler, a rubber compounding additive, plasticizers and mixtures thereof.

20. The thermoplastic composition of claim 1, additionally comprising a component selected from the group consisting of rubber processing oils, plasticizers and mixtures thereof.

21. The thermoplastic composition of claim 1, wherein said composition has a secant flexural modulus ranging from about 15,000 to about 60,000 $kg/cm^2$ measured according to ASTMD 790 at 1% strain.

* * * * *